Sept. 16, 1969  B. SANDOR  3,467,415
ADJUSTABLE CONNECTING ROD ASSEMBLY
Filed Feb. 27, 1968
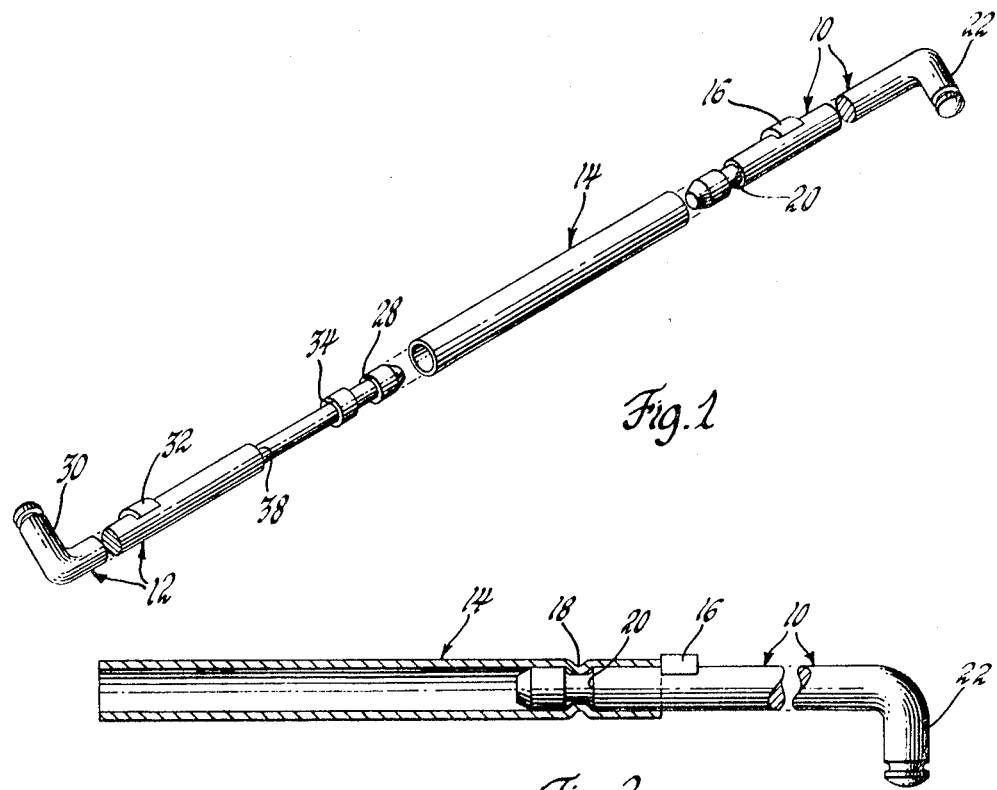
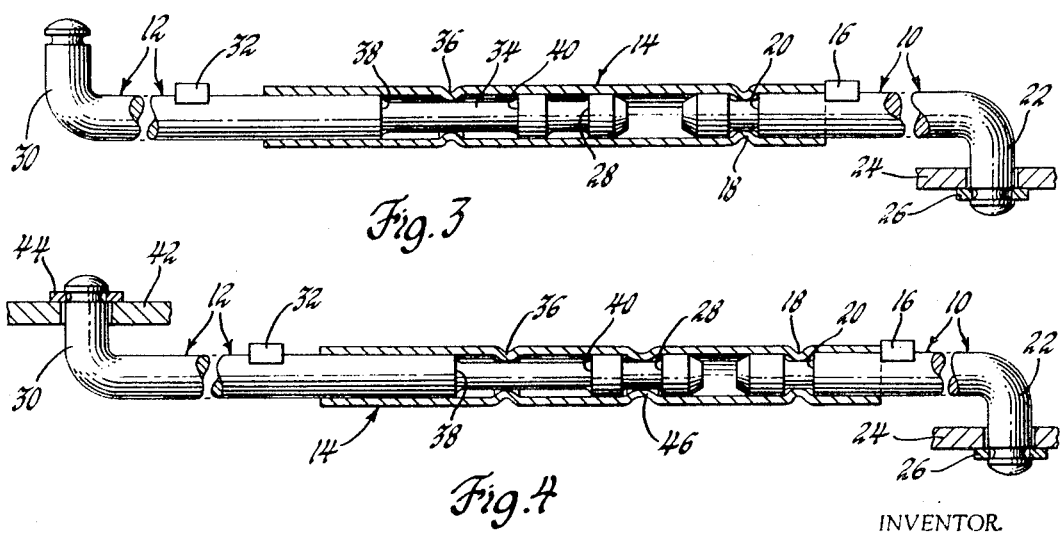
INVENTOR.
Bela Sandor
BY
Herbert Furman
ATTORNEY

United States Patent Office 3,467,415
Patented Sept. 16, 1969

3,467,415
ADJUSTABLE CONNECTING ROD ASSEMBLY
Bela Sandor, Detroit, Mich., assignor to General Motors Corporation, Detroit, Mich., a corporation of Delaware
Filed Feb. 27, 1968, Ser. No. 708,560
Int. Cl. F16b 7/00; F16d 1/00
U.S. Cl. 287—3        2 Claims

ABSTRACT OF THE DISCLOSURE

An annular rod is provided with a pair of spaced annular grooves, one being of greater longitudinal extent than the other. A tube receives the rod and when the end of the tube engages a stop on the rod, an annular rib is placed in the tube a predetermined distance from the stop so that this rib is located adjacent a wall of the groove to thereby interconnect the rod and the tube for longitudinal adjustment relative to each other. A second rod is provided with an annular groove and is received within the other end of the tube. When the end of the tube engages a stop on this rod, an annular rib is placed in the tube to axially fix the tube and second rod to each other but permit rotatable adjustment relative to each. The short lateral legs of the rods are connected to members to be operated and after this is done to fix the length of the assembly, a rib is provided in the tube to seat within the other groove of the first rod and thereby fix the tube and first rod to each other and fix the length of the assembly.

---

This invention relates to an adjustable connecting rod assembly and more particularly to an adjustable connecting rod assembly which may be preassembled to a variable length prior to installation and finally assembled to a fixed length after installation.

In modern mass production manufacture of various vehicle body components, it is often necessary to interconnect spaced members for operation of one by the other after the members have been installed on the body. Due to both production and assembly tolerances, the distance between the members varies so that a fixed connecting rod cannot be used. While there are various known adjustable connecting rod assemblies in the prior art, they are not suited to all types of installations due to the difficulty in adjusting the assembly in limited spaces, the limitation of certain assemblies for use only in interconnecting members movable in the same plane, or the limitation of certain assemblies in not being able to transmit different modes of movement of interconnected members in different planes.

The connecting rod assembly of this invention obviates these disadvantages of the various prior art connecting rod assemblies and has several distinct features.

One feature is that the connecting rod assembly may be initially preassembled to a variable length and be finally assembled to a fixed length after installation. Another feature is that the assembly will operatively interconnect spaced members and transmit more than one mode of movement of one member with respect to the other member. A further feature of this invention is that the assembly is easily and quickly fixed as to length after installation and in a minimum amount of space.

Generally the connecting rod assembly of this invention includes a pair of elongated telescopic members. One member is provided with a pair of annular grooves, one being of a greater extent than the other and setting the range of adjustment of the members. The other member has an abutment movable within this one groove to adjustably connect the members. After installation, the other member is provided with an additional abutment which fills the other groove of the one member to fix the members as to length. The assembly is made of a minimum number of easily manufactured parts and the final abutment in the other member can be made by a simple hand-crimping tool. Since the members are annular and the grooves and abutments are annular, the members can be both telescopically and rotatably adjusted with respect to each other prior to being fixed as to length and are also rotatable relative to each other after installation and fixation of the effective length of the assembly.

Other advantages and features of the connecting rod assembly of this invention will be readily apparent from the following specification and drawings wherein:

FIGURE 1 is an exploded perspective view of the parts of the assembly;

FIGURE 2 is an enlarged view, partially in section, of a portion of the assembly;

FIGURE 3 is an enlarged view, partially in section, of the assembly of variable length and prior to installation; and FIGURE 4 is a view of the assembly after installation and fixation as to length.

Referring to FIGURE 1 of the drawings, the assembly includes a right-hand rod member 10, a left-hand rod member 12, and an intermediate tubular member 14. The members 10 and 14 are assembled to each other by first inserting the member 10 within the member 14 until the edge of the member 14 engages a small semi-annular rib or stop 16 of the member 10 and thereafter annularly crimping the member 14 to provide an abutment or rib 18 within the annular groove 20 of the member 10.

The short lateral leg 22 of the member 10 is connected to any desired member 24 by inserting this leg through an aperture in the member 24 as shown in FIGURES 3 and 4 and thereafter securing the members 10 and 24 to each other by means of a split ring or other suitable clip 26. Various other manners of connecting the member 10 to the member 24 may also be used but the particular manner shown herein is adapted for vehicle body usage.

The member 12 is similar to the member 10 in that it includes an annular groove 28, a short lateral leg 30, and a semiannular rib or stop 32. However, the member 12 additionally includes an annular groove 34 which is of much greater longitudinal extent than the groove 28 and sets the range of adjustment of the members 12 and 14 relative to each other as will become apparent. In order to adjustably interconnect the members 12 and 14, the member 12 is inserted into the member 14 until the edge of the member 14 engages the stop 32 and an annular rib or abutment 36 is provided in the member 14. This rib or abutment is normally located immediately adjacent the left-hand wall 38 of the groove 34 so that the full range of adjustment of the members 12 and 14 relative to each other may be obtained. Any simple measuring device may be used to locate the rib 36 a predetermined distance from the stop 32 so that it will be properly located with respect to wall 38.

After this assembly of the members 12, 14 and 16 relative to each other, it is believed apparent that the member 12 is adjustable both rotatably and axially of member 14. The axial adjustment is limited by engagement of rib 36 with the walls 38 and 40 of groove 34. The unit can be shipped and easily handled without any worry of the parts being separated or the parts being misconnected. Additionally, the members 10, 14 and 12 are rotatably adjustable relative to each other so that it is not necessary that the members which are to be connected lie in the same plane, move in the same plane, or have the same mode of movement.

Initially the connecting rod assembly may be installed by connecting the member 10 to the member 24 as previously described, or members 10 and 12 can both be respectively connected at the same time to a member 24 and to another member 42, shown in FIGURE 4. The leg 30 of the member 12 is connected to the member 42 by extending through an aperture in this member and being secured against movement out of the aperture by a suitable spring clip 44. Although the members 24 and 42 are schematically shown as being located in parallel planes, it is believed apparent that they can also be located in intersecting planes and, further, it is not necessary that either member move in a single plane.

After the members 10 and 12 have been suitably connected to the members 24 and 42 to set the desired length of the assembly, a suitable crimping tool is used to provide an inwardly directed, radial abutment or rib 46 in the member 14 which extends within and fills the groove 28 to thereby fix the members 12 and 14 relative to each other and fix the length of the connecting rod assembly.

Although the members 10, 12 and 14 are shown as annular members, it is believed apparent that any two or all of these members may be polygonal in cross section if rotary adjustment is not required. Likewise, the ribs 18, 36 and 46 need not be complete annular ribs since partial circumferential ribs or a series of spaced partial circumferential ribs could be used. Since the groove 46 is a predetermined distance from the stop 32, any simple measuring device or the skill of the operator is all that is required to accurately locate this rib.

Thus, this invention provides an improved, adjustable connecting rod assembly.

I claim:
1. An adjustable connecting rod assembly comprising, in combination, a pair of elongated telescopic annular members, a pair of spaced grooves in one of the members, one groove being annular and having a longitudinal extent greater than the other, an abutment on the other member received within the one groove to interconnect the members for rotational movement and telescopic movement over a range determined by engagement of the abutment with the longitudinal walls of the groove, means connecting each telescopic member to one of a pair of spaced means to telescopically and rotationally locate the members relative to each other, and a second abutment on the other member received within and filling the second groove to telescopically fix the members relative to each other after location thereof.

2. An adjustable connecting rod assembly comprising, in combination, an annular elongated rod having a spaced pair of annular grooves, one groove having a longitudinal extent greater than the other, a tubular member receiving the annular rod and including an annular inwardly extending rib received within the one groove to interconnect the rod and member for telescopic and rotational movement over a range determined by engagement of the rib with the spaced walls of the one annular groove, means for connecting the rod and member to one of a pair of spaced means to telescopically locate the rod and member relative to each other, and a second annular rib on the tubular member received within and filling the second annular groove to telescopically fix the rod and member relative to each other after location thereof and permit rotational movement of the tubular member and rod relative to each other.

References Cited

UNITED STATES PATENTS

| 945,176 | 9/1909 | Thompson | 287—58 X |
| 1,248,592 | 12/1917 | Anderson. | |
| 2,298,140 | 10/1942 | Mace. | |
| 2,959,982 | 11/1960 | Cadwallader | 287—58 X |

EDWARD C. ALLEN, Primary Examiner

WAYNE L. SHEDD, Assistant Examiner

U.S. Cl. X.R.

287—58, 109